Dec. 13, 1955    A. B. CONROY ET AL    2,726,682
FLEXIBLE DUCT
Filed Nov. 7, 1952
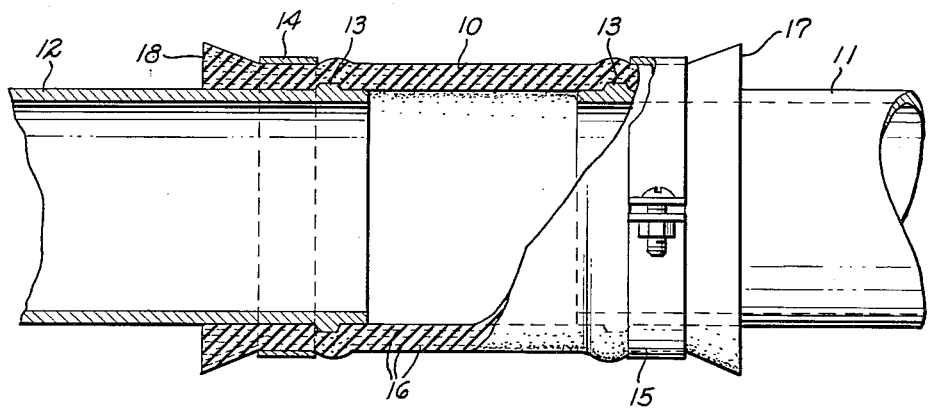
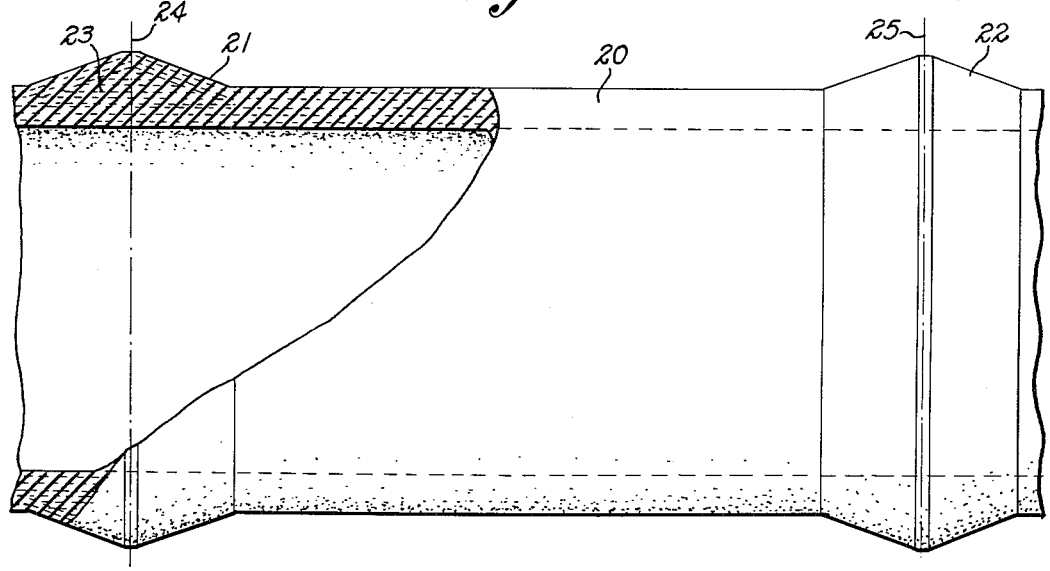
INVENTORS:
ALVIN E. HEWITT
ADDISON B. CONROY
By Vandeveer Voorhees
Atty.

United States Patent Office 2,726,682
Patented Dec. 13, 1955

2,726,682

FLEXIBLE DUCT

Addison B. Conroy, Long Beach, and Alvin E. Hewitt, La Habra Heights, Calif., assignors to Aeroduct, Inc., South Gate, Calif., a corporation of California Application November 7, 1952, Serial No. 319,196

7 Claims. (Cl. 138—55)

This invention relates to a flexible duct construction and more particularly to a clamping method and construction for attaching the duct to a rigid conduit or nipple. Still more particularly the invention relates to the construction of ducting or elastic tubing which is reinforced to withstand internal pressure and which at the same time retains its flexibility.

One object of the invention is to provide a duct construction which can be clamped to a pipe nipple without leakage after prolonged periods of service. Another object of the invention is to provide a duct construction which will remain tightly affixed to the conduit or nipple to which it is clamped without sliding off as a result of the effect of pressure. Still another object of the invention is to provide a method of manufacturing flexible ducting with special provision incorporated in the ends thereof for attaching to rigid conduits without substantially increasing the number of manufacturing operations and cost.

The invention is illustrated by a drawing which shows in Figure 1 a typical application of the invention to the union of two rigid conduits. Figure 2 illustrates a section of an elongated duct at one point in the manufacture thereof.

One of the problems encountered in the use of flexible ducting is to obtain secure attachment to rigid conduits. This is usually done by clamping the end of the duct over the end of the conduit or nipple. One or more ridges on the external surface of the nipple are usually provided to assist in locking the duct to the conduit. Various forms of clamps can be employed, the most common being a split metal band with a bolt drawing the ends of the band together about the end of the duct. Joints of the type just described often fail owing to the rubber or other elastic material of which the duct is constructed, taking a permanent set in the region where it is clamped. This phenomenon often results from the action of pressure on the duct causing it to expand and contract in service. The problem is particularly severe in case of ducting operating at elevated temperatures as in the case of conduits employed in heating and cooling systems particularly those encountered in airplanes. In the handling of hot gases in airplanes, for example the compressed air from turbocompressors, the temperatures of the gas may exceed 400° F. or 500° F. To withstand these temperatures it is the practice to employ flexible ducting constructed of silicone rubber reinforced with fabric of glass fiber. After service for a period of time there is a tendency for the clamped joints to develop leaks and even to separate completely sometimes with disastrous results.

In order to obtain the desired flexibility in ducts of this type, it is necessary to build the duct with annular convolutions, or if the duct is of plain cylindrical construction, to wind the reinforcing fabric on the bias. In any case, it is usually desirable that the reinforcing fabric at the ends of the duct be wound on the bias in order to permit the duct to be expanded or stretched over the rigid conduit to which it is attached. However, it has been found that where the reinforcing in a duct is wound on the bias there will be a tendency for the duct to "balloon" in the region where it is exposed to pressure between the clamped ends. As a result of this ballooning action the duct material tends to contract longitudinally, drawing the ends of the duct from under the clamps. Various means have been adopted in an attempt to overcome this problem such as incorporation of a bead at the end of the duct. In general these methods have not been successful because of the tendency of the duct material to shrink and undergo a permanent set as indicated hereinabove, so that even if the duct is prevented by the bead from escaping entirely from the nipple to which it is clamped, leakage may still result.

We have now solved this problem by a unique construction of duct which not only insures the duct remaining clamped to the nipple but compensates continually for the tendency of the duct to develop leaks as described hereinabove. We have accomplished this by providing the duct with a tapered wall section between the end and the clamp. Referring to Figure 1, the duct 10 is shown in cross section as it would appear when clamped to the ends of rigid conduits 11 and 12, also shown in section. One or more ridges or beads 13 on the ends of conduits 11 and 12 prevent the duct slipping from the ends of the conduits when properly clamped by clamps 14 and 15. The duct 10 is constructed of rubber, either natural or synthetic rubber, neoprene, acrylonitrile rubber, silicone rubber, GR–S, butyl, polyethylene, etc., reinforced with a suitable fabric or cord material 16, generally wound on the bias. The sections at the ends of the duct 10 beyond the clamps 14 and 15 are constructed in conical form i. e. with a wedged or tapered cross section indicated at 17 and 18. The increased thickness of the duct at the ends is obtained by means of additional layers of reinforcing fabrics or by the incorporation in this area of other suitable non-compressible solid material having the effect of reducing the elasticity and flow characteristics of the rubber body of the duct. Hereinafter this material will be referred to as a flow restricting reinforcing solid.

Clamps 14 and 15 may be of the conventional type or they may be slightly flared outwardly toward the end of the duct to match the conical shape of the end sections. When pressure is applied to the duct of this invention the contraction of the material, caused by ballooning, serves to draw the tapered ends of the duct beneath the clamps and wedge the duct still more tightly against the nipples. The incompressibility of the reinforcing material in the wedged ends effectively prevents the duct from creeping beneath the clamps as it does where an extra layer of rubber only is employed. The length of the tapered thickened end section is usually about ¼ to 1 inch or longer with quite large ducts. With ducts of the size most commonly used, e. g. 1½ inch to 6 inch diameter, the tapered section can be about ⅜ to ¾ inch long.

Ducts employing our construction may have any desired length but in most cases they are relatively short and their principal application is in joining rigid conduits, absorbing the vibrations therebetween. In the manufacture of our improved duct the rubberized fabric is conveniently wound on a mandrel in the usual manner until sufficient layers are applied to provide the desired thickness and strength. After the outer fabric surface is applied, the duct is stripped from the mandrel and cured in an oven or autoclave. If desired, the duct may be partially cured on the mandrel before stripping, and then finally cured subsequently.

The end sections of our improved duct are conveniently made by wrapping several additional layers of fabric or tape, preferably bias tape, in the region near the end of the duct. After the duct is cured it is trimmed at the point where the additional wrapping is applied. It is generally desirable to apply the extra wrapping over an intermediate layer of fabric during the construction of the duct, winding the final layer or layers of fabric over the reinforcing tape, then curing. In order to reduce the cost of operations in manufacturing short ducts, we have devised a method of building an elongated duct on a long mandrel in the customary manner and applying extra reinforcing at intervals along the duct corresponding with the lengths desired. Such a method of construction is illustrated in Figure 2 showing, in partial cutaway section, a portion of a long duct 20 with extra reinforcing wrappings at 21 and 22. The thickened end sections, 21 and 22 are conveniently made by applying one or more layers or bands of tape or reinforcing material during the winding of the duct. Such additional reinforcing material or band is shown at 23. The duct built up in this manner is cured in accordance with usual practice providing a long duct with nodes at intervals. The duct is then stripped and cured and cut into sections of the desired length by slicing through the nodes along the lines 24 and 25 as indicated in Figure 2.

Although we prefer to use fabric for reinforcing the ends of our improved ducts, numerous other materials can be employed, each material being selected to meet the operating conditions to which the duct is later subjected. Thus for example, in ducting employed for ordinary temperature operations we may employ cotton fabric. For operations at temperatures above 500° F. we prefer to use glass or metal stranded fabric. When employing fabric we prefer to use bias cut tape for reinforcing the ends to provide expansibility. We may also employ fabric of asbestos, nylon, rayon, jute, sisal, hemp, or other fibrous material.

Instead of fabric we may employ a dispersion of solid materials such as asbestos fiber, ground wood, cotton fibre, linters and/or granular mineral aggregates in a vulcanizable elastic material, usually the same rubber material of which the duct is constructed. For example, we may apply, to the duct, bands of asbestos fibre dispersed in rubber with sufficient solvent to facilitate application to the surface of the duct under construction. After evaporation of the solvent, the remaining layers of fabric are applied over the reinforced, tapered area. It is a common characteristic of our terminal reinforcing materials that they provide flexibility with limited elasticity substantially less than the elasticity of the rubber of which the duct is constructed. As a result of their solid, incompressible character they reduce the flow characteristics of the rubber and prevent the end of the duct from creeping under the clamping mechanism. When a granular aggregate is used, it is preferred to be about 20 to 100 mesh size in major part, although aggregate of 150-200 mesh may sometimes be used.

As a result of our improved duct construction we can apply higher pressures to our ducts without blowing them off the rigid conduits to which they are attached and without leakage beneath the clamps. If desired to further reinforce our ducts against pressure, they may be wound with wire, cord or other non-elastic strand in the customary manner generally terminating the strand at the clamp. Wire reinforcing is usually ended at a point sufficiently removed from the end of the duct to prevent interfering with stretching the duct over the rigid conduit. The ends of the wire winding can be secured as shown in application Ser. No. 297,046, now Patent No. 2,697,452. The maximum thickness of the tapered end sections will usually be about 1¼ to 3 times the average wall thickness of the duct, a thickness of 1½ to 2 times the wall thickness being satisfactory for most purposes.

Having thus described our invention what we claim is:

1. A flexible duct comprising an elastic body of rubberlike material, a reinforcing fabric within said body distributed substantially uniformly throughout length of said duct, and additional reinforcing fibrous material in the end section of said duct providing a generally tapered wall section of substantially increased thickness at the end of the duct, said end section being expansible to facilitate attachment to a rigid nipple of larger diameter than the internal diameter of said duct.

2. The duct of claim 1 wherein the said reinforcing fibrous material is a bias wound fabric tape.

3. The duct of claim 1 wherein said additional reinforcing fibrous material in said end section is interposed between layers of said reinforcing fabric distributed throughout the length of said duct.

4. The duct of claim 1 wherein said reinforcing fibrous material is asbestos fiber.

5. The method of making a plurality of flexible ducts having walls adjacent the ends thereof thickened by an expansible tapered, reinforced band with maximum thickness at the extremity, said method comprising winding on a long mandrel, layers of rubberized fabric, applying bands of expansible reinforcing fibrous material to the resulting ducting, said bands being spaced at intervals substantially equal to the final length of the desired ducts, curing the resulting assembly and cutting the ducting transversely at the approximate mid points of said bands.

6. The method of claim 5 wherein said reinforcing bands are applied between two layers of said fabric.

7. The method of claim 5 wherein said reinforcing bands are windings of bias fabric tape.

References Cited in the file of this patent

UNITED STATES PATENTS

| | | |
|---|---|---|
| 1,227,690 | Subers | May 29, 1917 |
| 1,316,052 | Lister | Sept. 16, 1919 |
| 1,584,935 | Hathorn | May 18, 1926 |
| 1,883,086 | Swartz | Oct. 18, 1932 |
| 1,939,872 | Bedur | Dec. 19, 1933 |
| 2,189,172 | Hathorn | Feb. 6, 1940 |
| 2,200,967 | Phillips | May 14, 1940 |
| 2,428,652 | Cole | Oct. 7, 1947 |
| 2,551,631 | Pearce | May 8, 1951 |
| 2,570,259 | McKinley | Oct. 9, 1951 |
| 2,693,223 | Krupp | Nov. 2, 1954 |

FOREIGN PATENTS

| | | |
|---|---|---|
| 236,127 | Great Britain | July 2, 1925 |